United States Patent
Ramakrishnan et al.

(10) Patent No.: US 10,248,567 B2
(45) Date of Patent: Apr. 2, 2019

(54) CACHE COHERENCY FOR DIRECT MEMORY ACCESS OPERATIONS

(71) Applicant: Hewlett-Packard Development Company, L.P., Houston, TX (US)

(72) Inventors: Senthil Kumar Ramakrishnan, Boise, ID (US); Eugene Cohen, Eagle, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 86 days.

(21) Appl. No.: 15/319,693

(22) PCT Filed: Jun. 16, 2014

(86) PCT No.: PCT/US2014/042513
§ 371 (c)(1),
(2) Date: Dec. 16, 2016

(87) PCT Pub. No.: WO2015/195076
PCT Pub. Date: Dec. 23, 2015

(65) Prior Publication Data
US 2017/0132130 A1 May 11, 2017

(51) Int. Cl.
*G06F 13/24* (2006.01)
*G06F 13/28* (2006.01)
(Continued)

(52) U.S. Cl.
CPC ...... *G06F 12/0835* (2013.01); *G06F 12/0804* (2013.01); *G06F 12/0815* (2013.01); *G06F 13/24* (2013.01); *G06F 13/28* (2013.01); *G06F 2212/1008* (2013.01); *G06F 2212/1032* (2013.01); *G06F 2212/621* (2013.01)

(58) Field of Classification Search
None
See application file for complete search history.

(56) References Cited

U.S. PATENT DOCUMENTS 5,097,532 A * 3/1992 Borup ............... G06F 12/0888
711/138
5,287,481 A * 2/1994 Lin ................... G06F 12/0891
711/135
(Continued)

FOREIGN PATENT DOCUMENTS

| EP | 0644491 | 4/2000 |
|---|---|---|
| WO | WO-2005121966 | 12/2005 |

OTHER PUBLICATIONS

Tang, D. et al., DMA Cache: Using On-Chip Storage to Architecturally Separate I/O Data from CPU Data for Improving I/O Performance, Nov. 7, 2009.

*Primary Examiner* — Michael Sun
(74) *Attorney, Agent, or Firm* — Brooks, Cameron & Huebsch PLLC

(57) ABSTRACT

Methods, apparatus, systems and articles of manufacture are disclosed to maintain cache coherency. Examples disclosed herein involve, in response to receiving, from a direct memory access controller, an interrupt associated with a direct memory access operation, handling the interrupt based on a parameter of the direct memory access operation, wherein the direct memory access controller is to execute the direct memory access operation.

14 Claims, 8 Drawing Sheets

(51) Int. Cl.
  *G06F 12/0815* (2016.01)
  *G06F 12/0831* (2016.01)
  *G06F 12/0804* (2016.01)

(56) References Cited

U.S. PATENT DOCUMENTS

| | | | |
|---|---|---|---|
| 5,555,398 A * | 9/1996 | Raman | G06F 12/0835 |
| | | | 711/143 |
| 5,664,149 A | 9/1997 | Martinez, Jr. et al. | |
| 5,745,732 A * | 4/1998 | Cherukuri | G06F 12/0835 |
| | | | 710/20 |
| 6,529,968 B1 * | 3/2003 | Anderson | G06F 13/1668 |
| | | | 710/22 |
| 6,553,460 B1 * | 4/2003 | Chopra | G06F 9/30047 |
| | | | 711/125 |
| 6,681,283 B1 * | 1/2004 | Thekkath | G06F 12/0815 |
| | | | 710/305 |
| 7,015,921 B1 | 3/2006 | Trivedi et al. | |
| 7,802,058 B1 | 9/2010 | Miller et al. | |
| 8,180,981 B2 | 5/2012 | Kapil et al. | |
| 8,631,222 B2 | 1/2014 | Craddock et al. | |
| 2002/0144064 A1 * | 10/2002 | Fanning | G06F 12/0897 |
| | | | 711/144 |
| 2003/0023783 A1 | 1/2003 | Arimilli et al. | |
| 2005/0216610 A1 | 9/2005 | Johns et al. | |
| 2006/0064518 A1 * | 3/2006 | Bohrer | G06F 13/28 |
| | | | 710/22 |
| 2006/0206635 A1 * | 9/2006 | Alexander | G06F 13/28 |
| | | | 710/22 |
| 2008/0282040 A1 * | 11/2008 | Doring | G06F 12/0862 |
| | | | 711/141 |
| 2009/0240847 A1 * | 9/2009 | Hu | G06F 12/08 |
| | | | 710/22 |
| 2013/0326155 A1 | 12/2013 | Chachad | |
| 2014/0122833 A1 * | 5/2014 | Davis | G06F 15/7803 |
| | | | 712/29 |
| 2014/0129784 A1 * | 5/2014 | Chapman | G06F 1/329 |
| | | | 711/154 |

* cited by examiner

CACHE COHERENCY FOR DIRECT MEMORY ACCESS OPERATIONS

BACKGROUND

Processing systems, also known as processor platforms, commonly include a processor or central processing unit (CPU), a memory (e.g. a volatile memory, a non-volatile memory, a main memory, a mass storage device, etc.), and a cache among many other system components and/or hardware (e.g. interface cards, input/output (I/O) devices or peripherals, etc.). The CPU and the cache may be collocated on a same semiconductor chip or device. The CPU may locally store data from the memory into the cache.

Direct memory access (DMA) is a feature of processing systems found in many computing devices (e.g., personal computers, tablet computers, mobile devices, etc.). DMA operations allow certain hardware components (e.g., DMA controllers), interface cards, peripherals, etc. of a processing system to access a memory of the processing system independently of the CPU. The CPU may initiate a DMA operation, and a DMA controller executes the DMA operation, while the CPU continues other operations.

DETAILED DESCRIPTION

Figure 1:
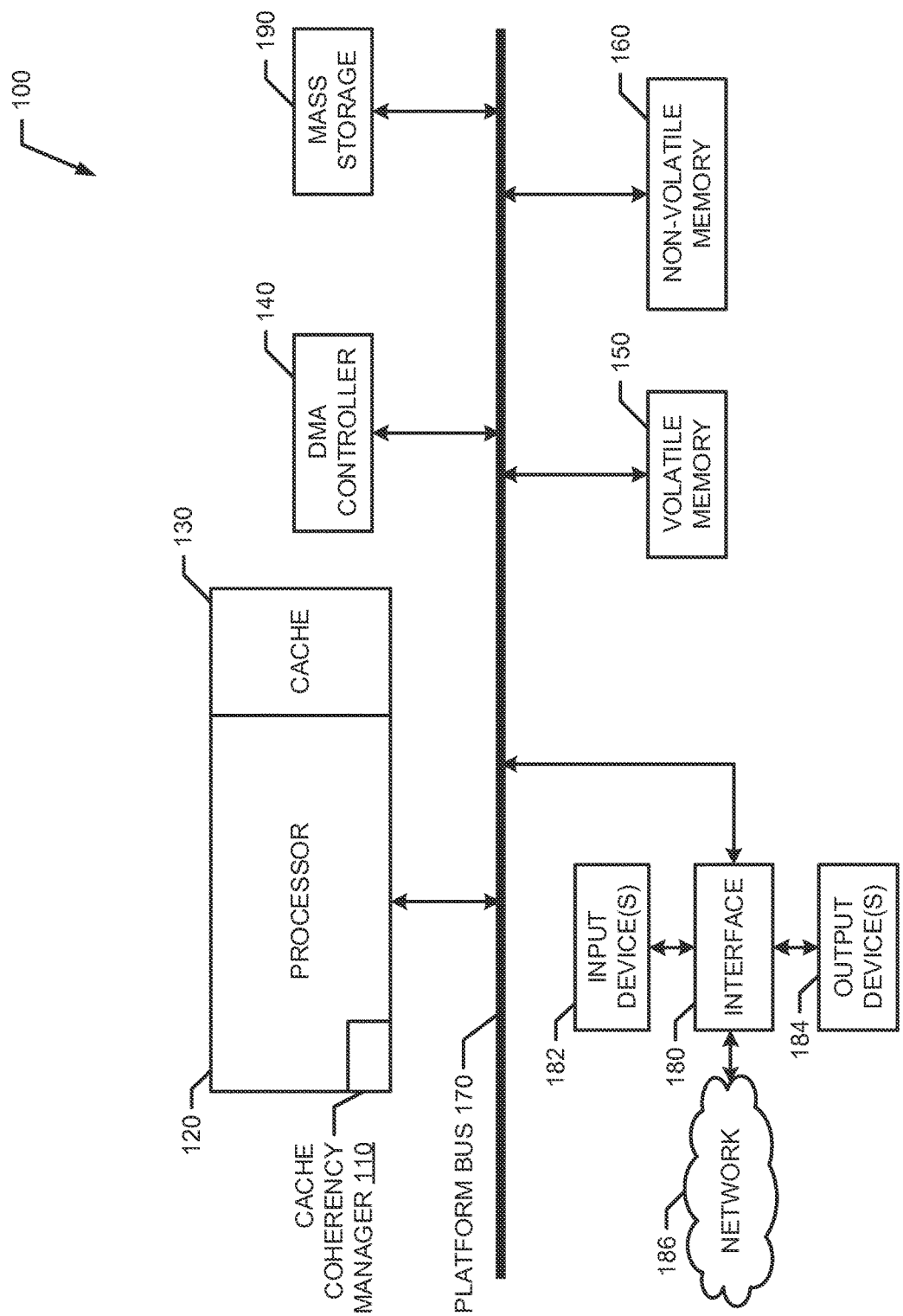
FIG. 1 is a block diagram of an example processor platform including an example cache coherency manager implemented in accordance with the teachings of this disclosure.

Example methods, systems, and articles of manufacture disclosed herein involve maintaining cache coherency across direct memory access (DMA) operations. Examples disclosed herein involve a cache coherency manager to handle an interrupt received from a DMA controller to maintain cache coherency. The cache coherency manager may handle the interrupt by flushing and/or invalidating a cache of a processor system based on a parameter (e.g., a direction) of the DMA operation.

In previous techniques, when a DMA operation is set up, a DMA controller receives parameters of the DMA operation. For example, an application setting up the DMA operation may send a source address, a destination address, and a number of bytes of data of the DMA operation to the DMA controller. In these previous techniques, the DMA controller would then begin executing the DMA operation by writing to a hardware register of the DMA controller. Such previous techniques may frequently cause cache coherency issues as locations of memory of the DMA operations (e.g., the destination address) may correspond to data in a cache associated with the memory (i.e., the cache and the memory are components of a processor system). Accordingly, following the DMA operations, the cache data may no longer appropriately match corresponding data in memory, resulting in a lack of cache coherency.

Cache coherency is desirable in processor systems to prevent errors and/or system failures. For example, if data in a cache does not match or suitably match corresponding data in a memory, processors may access improper versions of data and/or non-existent data. Accordingly, as used herein, maintaining cache coherency refers to a technique to ensure that cache data properly matches corresponding memory data. As used herein, flushing a cache involves writing back data from the cache to a main memory device. As used herein, invalidating a cache and/or a location in a cache involves removing/clearing data from the cache and/or location in the cache, respectively. As used herein, the phrase, "associated with," refers to the presence of a relationship (e.g., communicative, hierarchical, parametric, etc.) between at least two elements or components. As used herein, an interrupt refers to a message, prompt, or other instrument used for communication between components of a system. As used herein, software is computer readable instructions stored on a tangible computer readable medium (e.g., a storage device or storage disc) that are executable by a processor.

Examples disclosed herein involve, in response to receiving an interrupt associated with a direct memory access operation from a direct memory access controller, handling the interrupt based on a parameter of the direct memory access operation, wherein the direct memory access controller is to execute the direct memory access operation. An example system disclosed herein includes a hardware direct memory access controller and a software cache coherency manager and/or a cache coherency manager in system firmware to maintain cache coherency. An example method includes determining that a direct memory access operation is to be executed, generating an interrupt corresponding to the direct memory access operation, and sending the interrupt to a cache coherency manager to maintain cache coherency.

FIG. 1 is a block diagram of an example processor system 100 of a machine including a cache coherency manager 110 implemented in accordance with the teachings of this disclosure. The processor system 100 includes a processor 120, a cache 130, a direct memory access (DMA) controller 140, a volatile memory 150, a non-volatile memory 160, a platform bus 170, an interface circuit 180, and a mass storage device 190. In the illustrated example of FIG. 1, the processor 120 includes the cache coherency manager 110 constructed in accordance with the teachings of this disclosure. The cache coherency manager 110 handles interrupts associated with DMA operations detected and/or received by the DMA controller 140. The cache coherency manager 110 may handle received interrupts to maintain cache coherency by flushing and/or invalidating all or part of a cache depending on at least one parameter (e.g., a direction, an address, etc.) of the DMA operation. Accordingly, the cache coherency manager 110 maintains cache coherency between the cache 130 and at least one of the volatile memory 150 or non-volatile memory 160. In other words, the cache coherency manager 110 ensures that data in the cache 130 suitably matches (e.g., is a corresponding copy of) corresponding data in the volatile memory 150 and/or non-volatile memory 160 (and vice versa). The processor 120 of FIG. 1 may be collocated on a same device (e.g., a same semiconductor chip) as the cache 130.

The processor 120 of FIG. 1 is hardware that executes software and/or computer readable instructions of the processor system 100. For example, the processor 120 may be implemented by at least one integrated circuit, logic circuit, microprocessor, or controller from any desired family or manufacturer. More specifically, the processor 120 may be an ARM processor, an x86 processor, an MIPS core processor, or any other type of processor. The processor 120 of FIG. 1 may include a central processing unit (CPU) of the processor system 100 with a hardware processing core, a memory controller, and/or other software, firmware, or hardware components.

In the illustrated example of FIG. 1, the platform bus 170 facilitates communication between the processor 120, the DMA controller 140, the volatile memory 150, the non-volatile memory 160, the interface circuit 180, and/or the mass storage device 190. The example DMA controller 140 of FIG. 1 is hardware implemented by at least one integrated circuit, logic circuit, microprocessor, or controller from any desired family or manufacturer. In some examples, the DMA controller 140 may be implemented by a plurality of individual DMA controllers with the same or similar capabilities as those disclosed herein in connection with the DMA controller 140. In some examples, the DMA controller 140 may be implemented by DMA controller(s) collocated with peripheral(s) of the processor system 100. For example, each of the input device(s) 182, the output device(s) 184, the interface 180, the mass storage 190, etc. may include a DMA controller similar to the DMA controller 140. For ease of readability, the DMA controller 140 may be used herein to refer to any DMA controller collocated with a peripheral of the processor system 100.

The example DMA controller 140 of FIG. 1 monitors for (e.g., identifies, detects, etc.) attempted or initiated DMA operations within the processor system 100. For example, the DMA controller 140 may determine (e.g., via a data request) that an application and/or driver module being executed by the processor 120 is initiating a DMA operation. In another example, the DMA controller 140 may determine that the interface circuit 180 and/or the mass storage device 190 is attempting a DMA operation involving the volatile memory 150. In some examples, the DMA controller 140 may be initially setup (e.g., upon startup) for designated DMA operations (e.g., for scatter/gather operations). In some such examples, the DMA controller 140 may monitor for and/or detect DMA operations based on certain regions of memory targeted by the DMA operations and/or hardware attempting the DMA operations.

The example DMA controller 140 of FIG. 1 generates interrupts for determined DMA operations and/or sends the interrupts to the cache coherency manager 110. The generated interrupts may include parameters (e.g., a direction, a source address, a destination address, a byte size, etc.) of the DMA operations. Furthermore, the DMA controller 140 of FIG. 1 executes the DMA operations by accessing the memory accordingly. The DMA controller 140 of FIG. 1 may executed the DMA operations before and/or after the cache coherency manager 110 maintains cache coherency in accordance with the teachings of this disclosure.

In examples disclosed herein, the DMA controller 140 of FIG. 1 may send the interrupt to the cache coherency manager 110 before and/or after executing the DMA operation. The example interrupt may be a trigger message to indicate that the DMA operation is to be executed in the processor system 100. In some examples where the processor 120 supports multiple interrupt lines, a specific interrupt line may be designated for interrupts sent between the DMA controller 140 and the cache coherency manager 110. In examples in which the processor 120 does not support multiple interrupt lines, the DMA controller 140 may demultiplex interrupt parameters (e.g., source/destination addresses, direction, size, etc.) to a designated location (e.g., a set of register locations of the DMA controller 140 and/or a memory location the volatile memory 150 and/or non-volatile memory 160).

Timing for when the DMA controller 140 in the example of FIG. 1 sends an interrupt to the cache coherency manager 110 may depend on a parameter (e.g., a direction, a size, an address, etc.) of the DMA operation. For example, if the DMA operation (e.g., a read) is from a memory (e.g., the volatile memory 150 or the non-volatile memory 160) to a peripheral (e.g., the interface circuit 180, the storage device 190, an application/driver module being executed by the processor 120, etc.) the interrupt may be sent to the cache coherency manager 110 so that the cache coherency manager 110 may flush a cache (e.g., the cache 130) associated with the memory. As another example, if the DMA operation is from a peripheral to a memory, the DMA controller 140 may send the interrupt after the DMA controller 140 executes the DMA operations so that the cache coherency manager 110 may invalidate a cache associated with the memory or a cache location corresponding to a memory location of the DMA operation.

The example cache 130 is a local storage circuit that may be collocated on a same device (e.g., a semiconductor chip) as the example processor 120. In the illustrated example of FIG. 1, the processor 120 can perform faster read and/or write operations when accessing data in the cache 130 than when accessing data in the volatile memory 150 and/or in the non-volatile memory 160 via the platform bus 170. Accordingly, the processor 120 may load data from the volatile memory 150 and/or the non-volatile memory 160 into the cache 130 so that the processor 120 can access the data relatively faster using the cache 130. When data is modified in the cache 130, write back operations are used to perform the same modifications on the corresponding data in the volatile memory 150 and/or the non-volatile memory 160 so that the data in the cache 130 and corresponding data in the volatile memory 150 or corresponding data in the non-volatile memory 160 are the same or similar. Without such write back operations, errors or system failures may occur as the storage devices 150 and 160 would not have an accurate and/or current version of the most recent data updated in the cache 130. Because DMA operations may involve data in the cache 130, the cache coherency manager 110 handles interrupts associated with DMA operations to ensure that data in the cache 130 is valid to avoid such errors and/or system failures.

The example volatile memory 150 of FIG. 1 is any volatile memory storage device that stores data when powered, but loses memory state when power is removed. For example, the volatile memory 150 may be implemented by Synchronous Dynamic Random Access Memory (SDRAM), Dynamic Random Access Memory (DRAM), Static Random Access Memory (SRAM), RAMBUS Dynamic Random Access Memory (RDRAM) and/or any other type of volatile memory. The non-volatile memory 160 is any non-volatile memory storage device (e.g., phase-change memory, memristor memory, etc.) that is capable of storing data when powered and when not powered.

The interface circuit 180 of FIG. 1 may be implemented by any type of interface standard, such as an Ethernet interface, a universal serial bus (USB), a Peripheral Component Interconnect (PCI) express interface, etc. The example interface circuit 180 may include an advance extensible interface (AXI) controller, a PCI controller, a PCIe controller, an Infiniband, etc. to facilitate a bridge to the platform bus 170 from any peripheral of the processor system 100. In the illustrated example, at least one input device 182 is connected to the interface circuit 180. The input device(s) 182 permit(s) a user to enter data and commands into the processor core 130. The input device(s) 182 can be implemented by, for example, an audio sensor, a microphone, a camera (still or video), a keyboard, a button, a mouse, a touchscreen, a track-pad, a trackball, isopoint and/or a voice recognition system. At least one output device 184 is also connected to the interface circuit 180 of the illustrated example of FIG. 1. The output devices 184 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 180 of the illustrated example, thus, typically includes a graphics driver card, a graphics driver chip or a graphics driver processor. In some examples, at last one of the interface circuit 180, the input device(s), or the output device(s) 184 may include a DMA controller (e.g., the DMA controller 140).

The interface circuit 180 of the illustrated example also includes a communication device such as a transmitter, a receiver, a transceiver, a modem and/or network interface card to facilitate exchange of data with external machines (e.g., computing devices of any kind) via a network 186 (e.g., an Ethernet connection, a digital subscriber line (DSL), a telephone line, coaxial cable, a cellular telephone system, etc.). Accordingly, the interface circuit 180 may facilitate communication with the network 186. As such, the interface circuit 180 may initiate DMA operations involving the volatile memory 150 and/or the non-volatile memory 160 from at least one of the input device(s) 182, the output device(s) 184, or the network 186.

The processor system 100 in the illustrated example of FIG. 1 also includes at least one mass storage device 190 for storing software and/or data. Examples of such mass storage devices 190 include floppy disk drives, hard drive disks, compact disk drives, Blu-ray disk drives, RAID systems, and digital versatile disk (DVD) drives. In some examples, the mass storage devices 190 may be implemented using the non-volatile memory 150. In some examples, the mass storage device 190 may include a DMA controller (e.g., the DMA controller 140).

The processor system 100 of FIG. 1 may be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

Figure 2A:
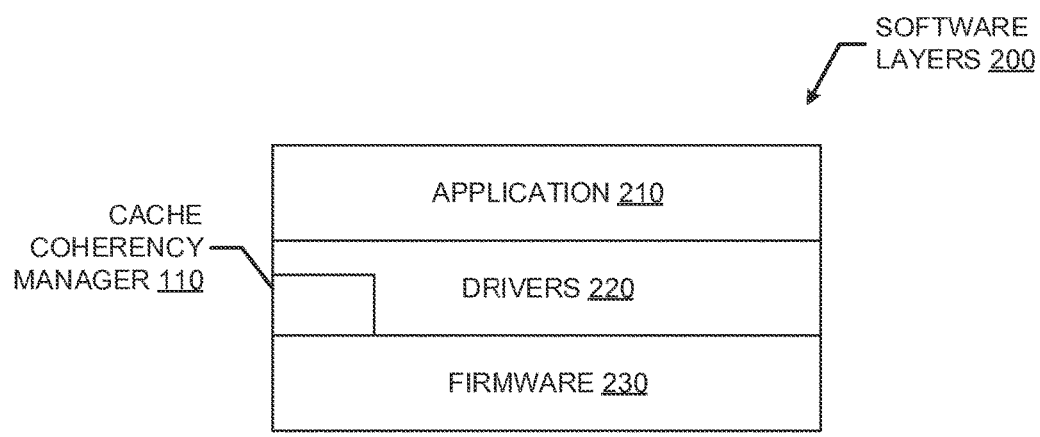
FIG. 2A illustrates an example software layer diagram representative of software layers of a processor of the processor platform of FIG. 1 including the cache coherency manager in a driver software layer of the processor.
Figure 2B:
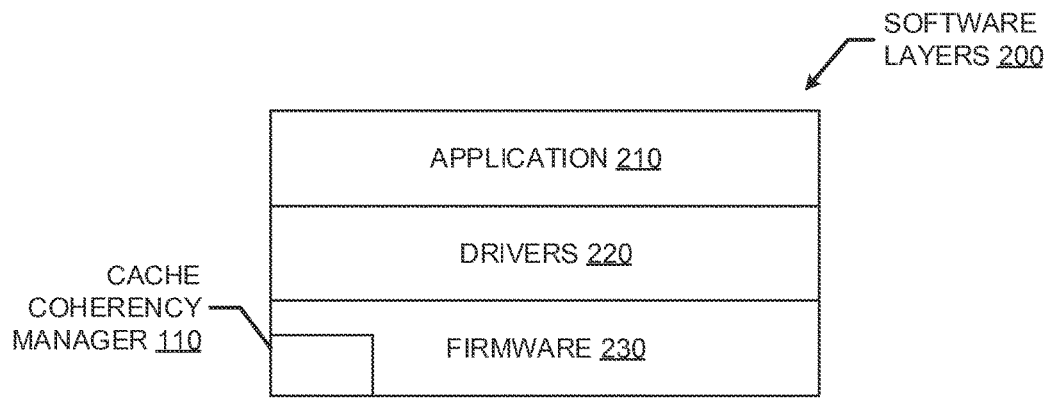
FIG. 2B illustrates another example software layer diagram representative of software layers of another processor of the processor platform of FIG. 1 including the cache coherency manager in a firmware layer of the processor.

As mentioned above, the processor 120 of FIG. 1 includes the cache coherency manager 110. In some examples, the cache coherency manager 110 is implemented by a program and/or software (e.g., computer readable instructions) executed by the processor 120 and/or implemented by firmware of the processor 120. FIGS. 2A and 2B illustrate software layers 200 of the processor 120 comprising the cache coherency manager 110. The software layers 200 of FIGS. 2A and 2B include an application layer 210, a driver layer 220, and a firmware layer 230. In some examples, other layers (e.g. operating system (OS), basic input/output system (BIOS), hardware abstraction layer (HAL), etc.) may be included. The application layer 210 may include application software for programs executed by the processor 120. The driver layer 220 includes driver software for driving and/or managing peripherals (e.g., input/output devices, interface circuits, printers, storage devices etc.) associated with the processor 120 and/or in communication with the processor system 100. The firmware layer 230 may include software stored within the processor 120 for running and/or managing the processor system 100 (e.g., a board/platform service package (BSP). In the illustrated example of FIG. 2A, the cache coherency manager 110 is located in the driver layer 220. Accordingly, computer readable instructions to implement the cache coherency manager 110 of FIG. 2A may be installed and/or stored as a driver or within driver software in the processor 120. In the illustrated example of FIG. 2B, computer readable instructions to implement the cache coherency manager 110 of FIG. 2B may be installed and stored as firmware (e.g., in the BSP) of the processor 120. In some examples, the cache coherency manager 110 may be implemented by computer readable instructions within and/or across multiple software layers of the processor 120 (e.g., both the driver layer 220 and the firmware layer 230).

Figure 3:
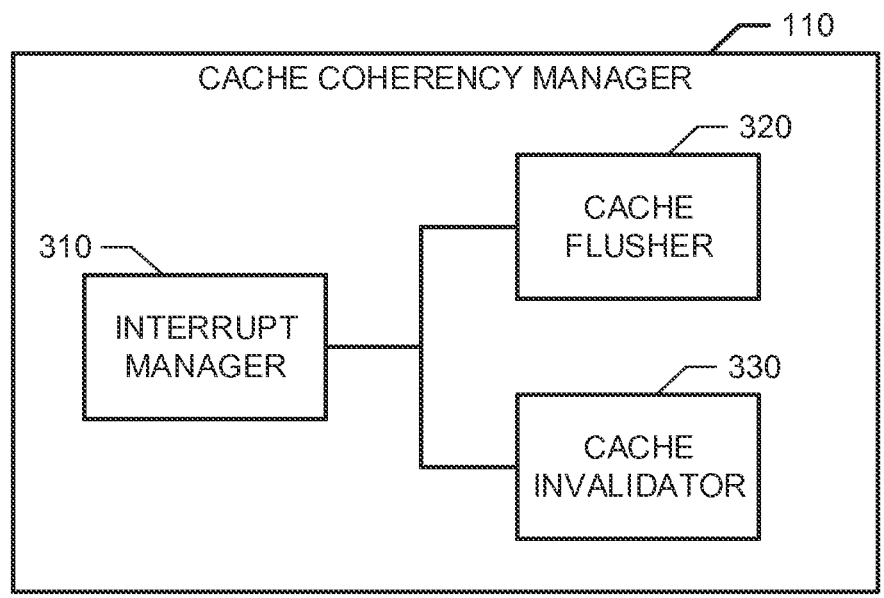
FIG. 3 is a block diagram of an example cache coherency manager constructed in accordance with the teachings of this disclosure.

FIG. 3 is a block diagram of an example cache coherency manager 110 that may be used to implement the cache coherency manager 110 of FIGS. 1, 2A, and/or 2B. As previously mentioned, the cache coherency manager 110 handles interrupts from the DMA controller 140 to maintain cache coherency in the processor system 100. In the illustrated example of FIG. 3, the cache coherency manager 110 includes an interrupt manager 310, a cache flusher 320, and a cache invalidator 330. The interrupt manager 310 of FIG. 3 receives interrupts (e.g., messages, prompts, etc.) from the DMA controller 140 of FIG. 1. The example interrupt manager 310 may then analyze the interrupt to identify parameter(s) (e.g., a direction) of a DMA operation that is to be executed by the DMA controller 140. Based on the identified parameter(s) the interrupt manager 310 may then instruct the cache flusher 320 to flush the cache 130 and/or the cache invalidator 330 to invalidate the cache 130. In some examples, when the interrupt manager 310 determines that a direction of a DMA operation is from a memory to a peripheral, the interrupt manager 310 instructs the cache flusher 320 to flush the cache 130. In examples in which the interrupt manager 330 determines that the direction of a DMA operation is from a peripheral to a memory, the interrupt manager 310 instructs the cache invalidator 330 to invalidate the cache 130 and/or a location of the cache 130 corresponding to a memory location of the DMA operation.

The cache flusher 320 of FIG. 3 flushes the cache 130 by writing back data to corresponding locations in the volatile memory 150 and/or the non-volatile memory 160. In some examples, after flushing the cache 130, the cache flusher 320 may instruct the cache invalidator 330 to invalidate the cache 130 or portions of the cache 130. Accordingly, when the cache flusher 320 of the cache coherency manager 110 flushes the cache 130, cache coherency is maintained by ensuring that the most updated data is in the volatile memory 150 and/or the non-volatile memory 160 before performing a DMA operation (e.g., a DMA operation from a memory to a peripheral).

The cache invalidator 330 of FIG. 3 invalidates the cache 130 by clearing data from the cache 130. In some examples, the cache invalidator 330 only clears a portion of the cache 130. For example, the cache invalidator 330 may identify a cache location corresponding to a memory location of a DMA operation (e.g., a location corresponding to an address identified by the interrupt manager 310), and clears the data from the cache location. Accordingly, when the cache invalidator 330 clears the data from the cache 130, cache coherency is maintained by removing data that is not up to date with the volatile memory 150 and/or the non-volatile memory 160 before and/or after performing a DMA operation (e.g., a DMA operation from a peripheral to a memory). Furthermore, if the processor 120 is to access data from the memory location of the DMA operation at a later time, because corresponding data is no longer stored in the cache 130, the processor 120 may load the data from the memory location of the volatile memory 150 and/or non-volatile memory 160, which is the most updated data.

The cache coherency manager 110 of FIG. 3 may communicate with the DMA controller 140 to indicate that the interrupt has been handled. For example, the interrupt manager 310 may send an interrupt completion message or prompt to the DMA controller 140 indicating the interrupt has been cleared. Accordingly, in some examples, once the interrupt completion message (interrupt cleared message) has been received, the DMA controller 140 may then execute the DMA operation while maintaining cache coherency in the processor system 100.

While an example manner of implementing the cache coherency manager 110 of FIG. 1 is illustrated in FIG. 3, at least one of the elements, processes and/or devices illustrated in FIG. 3 may be combined, divided, re-arranged, omitted, eliminated and/or implemented in any other way. Further, the interrupt manager 310, the cache flusher 320, the cache invalidator 330, and/or, more generally, the example cache coherency manager 110 of FIG. 3 may be implemented by hardware (e.g., the processor 120), software, firmware and/or any combination of hardware, software, and/or firmware. Thus, for example, any of the interrupt manager 310, the cache flusher 320, the cache invalidator 330, and/or, more generally, the example cache coherency manager 110 could be implemented by at least one of an analog or digital circuit, a logic circuit, a programmable processor (e.g., the processor 120), an application specific integrated circuit (ASIC), a programmable logic device (PLD), a field programmable logic device (FPLD), and/or a field programmable gate array (FPGA). At least one of the interrupt manager 310, the cache flusher 320, the cache invalidator 330 is/are hereby expressly defined to include a tangible computer readable storage device or storage disk, such as a memory, storing the software and/or firmware. Further still, the example cache coherency manager 110 of FIG. 3 may include at least one element, process, and/or device in addition to, or instead of, those illustrated in FIG. 3, and/or may include more than one of any or all of the illustrated elements, processes and devices.

Figure 4:
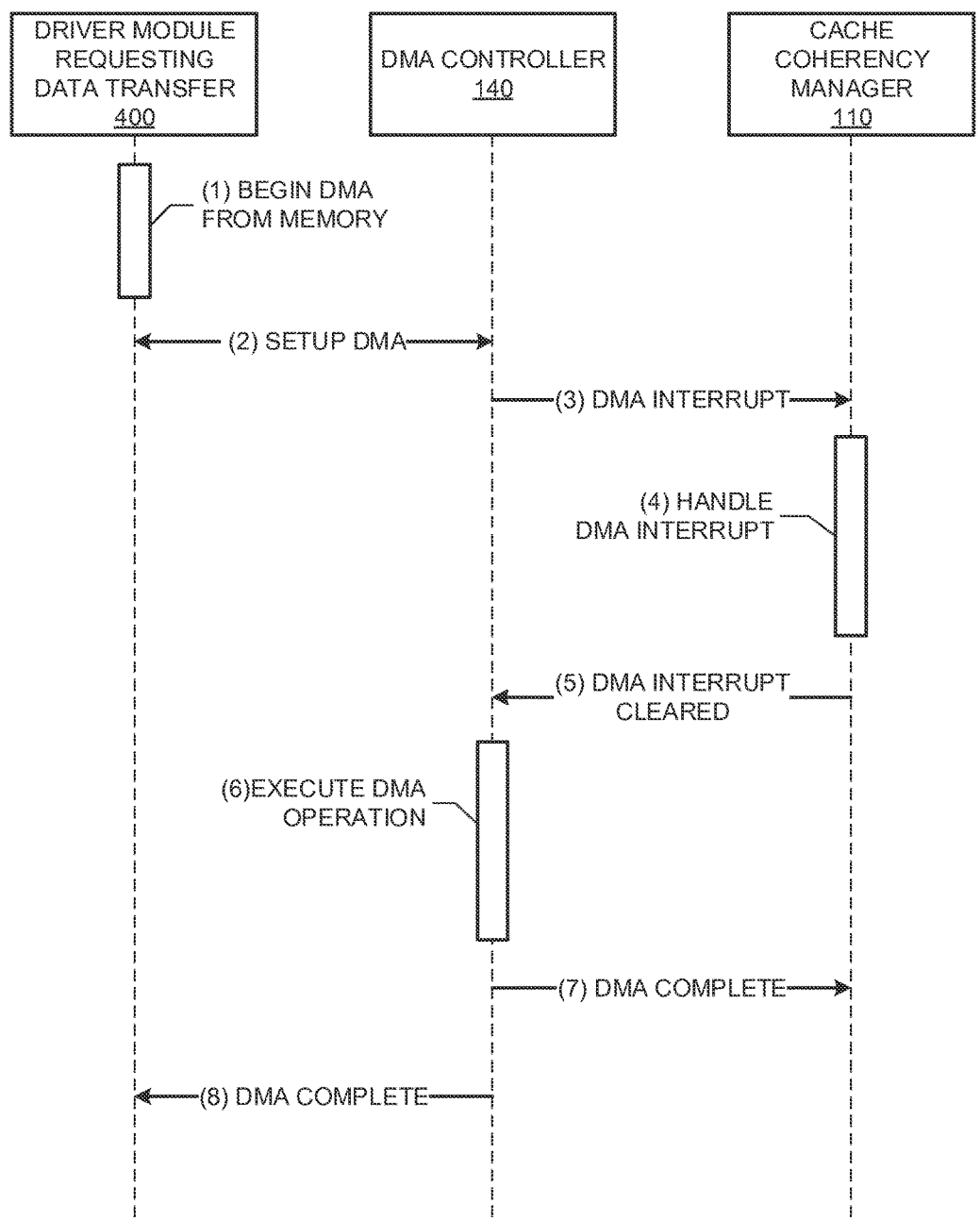
FIG. 4 illustrates a flow diagram of example events and example messages in the processor platform of FIG. 1 to handle a direct memory access operation requested by an application/driver module in accordance with the teachings of this disclosure.
Figure 5:
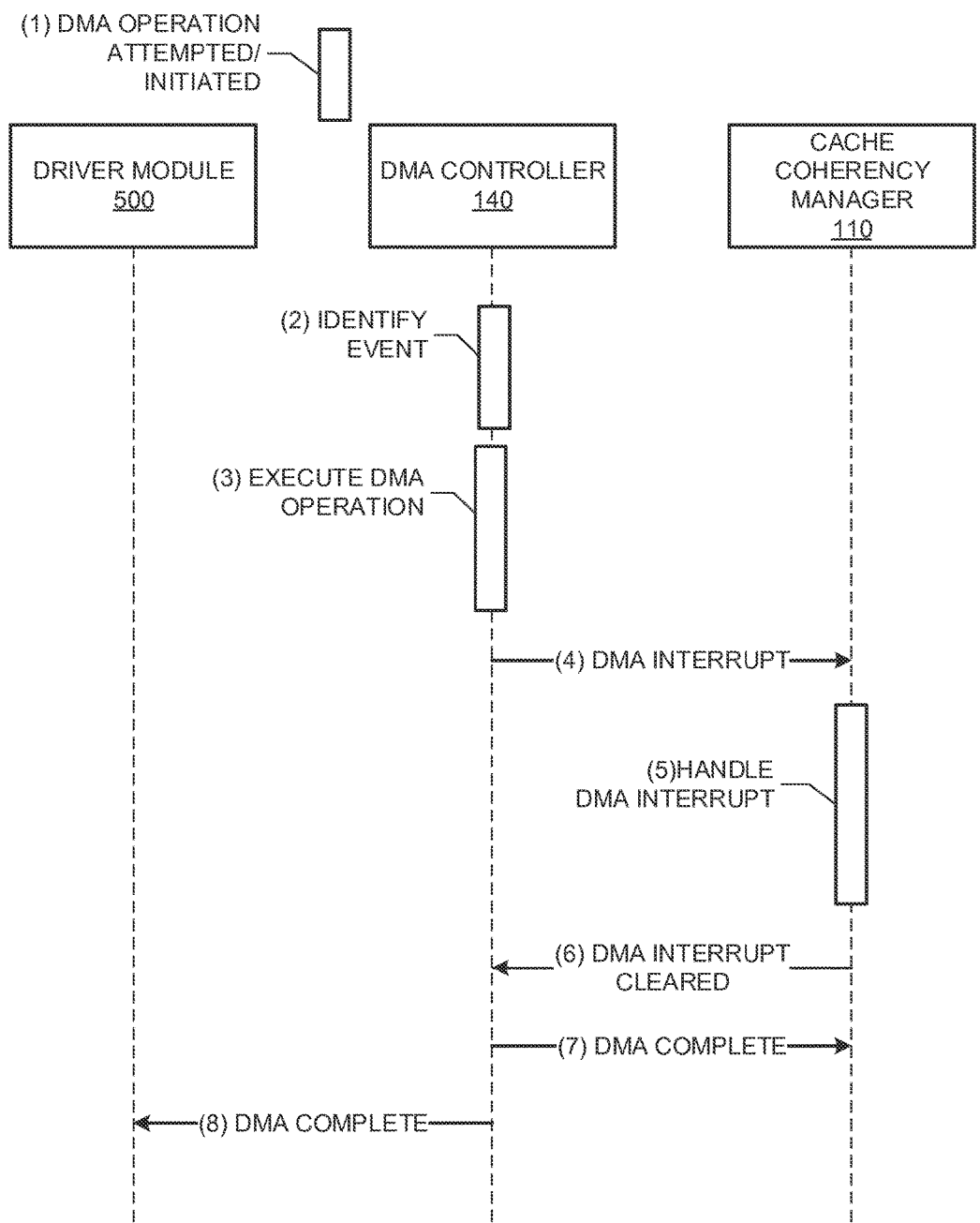
FIG. 5 illustrates a flow diagram of example events and example messages in the processor platform of FIG. 1 to handle a direct memory access operation identified by a direct memory access controller in accordance with the teachings of this disclosure.

FIG. 4 illustrates a flow diagram of events and messages in the processor platform of FIG. 1 to handle a DMA operation requested by an application/driver module in accordance with the teachings of this disclosure. The messages in the illustrated example of FIGS. 4 and 5 are exchanged between a driver module 400, 500, the DMA controller 140 of FIG. 1, and the cache coherency manager 110 of FIG. 1. The events and/or messages in each of the examples of FIGS. 4 and 5 are in chronological order from (1)-(8). In other examples, the events and/or messages may be the same but the order of events and/or messages (1)-(8) may be different (and vice versa).

In FIG. 4, the example driver module 400 may be a driver module (and/or an application module) being executed by the processor 120 of FIG. 1. At event (1) of FIG. 4, the driver module 400 begins a DMA operation to access data from the memory (e.g., a read). For example, at event (1), the driver module 400 may attempt a DMA operation without involving the DMA controller 140 or the driver module 400 may send a request to the DMA controller 140. In message (2) of FIG. 4, the DMA controller 140 may detect the DMA operation initiated by the driver module 400 (denoted by an arrow directed toward the driver module 400) and/or may receive a request to setup the DMA operation from the driver module 400 (denoted by an arrow directed toward the DMA controller 140).

In FIG. 4, in message (3) the DMA controller 140 sends a DMA interrupt to the cache coherency manager 110. At event (4), the cache coherency manager 110 handles the DMA interrupt to maintain cache coherency. Based on the direction of the DMA operation going form the memory to the peripheral (i.e., the driver module 400), the cache coherency manager 110, at event (4), may handle the interrupt by flushing the cache 130. In message (5), the cache coherency manager 110 indicates to the DMA controller 140 that the DMA interrupt has been cleared after handling the DMA interrupt.

At event (6) of FIG. 4, the DMA controller 140 executes the DMA operation by retrieving the data from the memory and providing the data to the driver module 400 requesting the data). In message (7) and (8) of FIG. 4, the DMA controller 140 indicates to the cache coherency manager 110 and the driver module 400, respectively, that the DMA operation is complete.

FIG. 5 illustrates a flow diagram of events and messages in the processor platform of FIG. 1 to handle a DMA operation identified/detected by the DMA controller 140 in accordance with the teachings of this disclosure. In the example of FIG. 5, at event (1) a DMA operation occurs in the processor system 100. The example DMA operation of FIG. 5 is a scatter/gather operation in which data arriving via the network 186 of FIG. 1 is to be DMA-ed to the volatile memory 150 based on the driver module 500 providing DMA setup instructions to the DMA controller 140.

At event (2) of FIG. 5, the DMA controller 140 identifies and/or detects the event (e.g., the DMA controller 140 detects the attempted DMA operation from the interface circuit 180 to the volatile memory 150 via the platform bus 170). At event (3), the DMA controller executes the DMA operation by writing the network data to the volatile memory 150. In message (4), the DMA controller 140 sends an interrupt to the cache coherency manager 110.

At event (5) of FIG. 5, the cache coherency manager 110 handles the interrupt by invalidating the cache 130 (based on the direction of the DMA operation being from a peripheral (the interface circuit 180) to memory (the volatile memory 150). In message (6), the cache coherency manager 110 indicates to the DMA controller 140 that the DMA interrupt has been cleared after handling the DMA interrupt. In messages (7) and (8) of FIG. 5, the DMA controller 140 indicates that the DMA operation is complete to the cache coherency manager 110 and the driver module 500, respectively.

Figure 6:
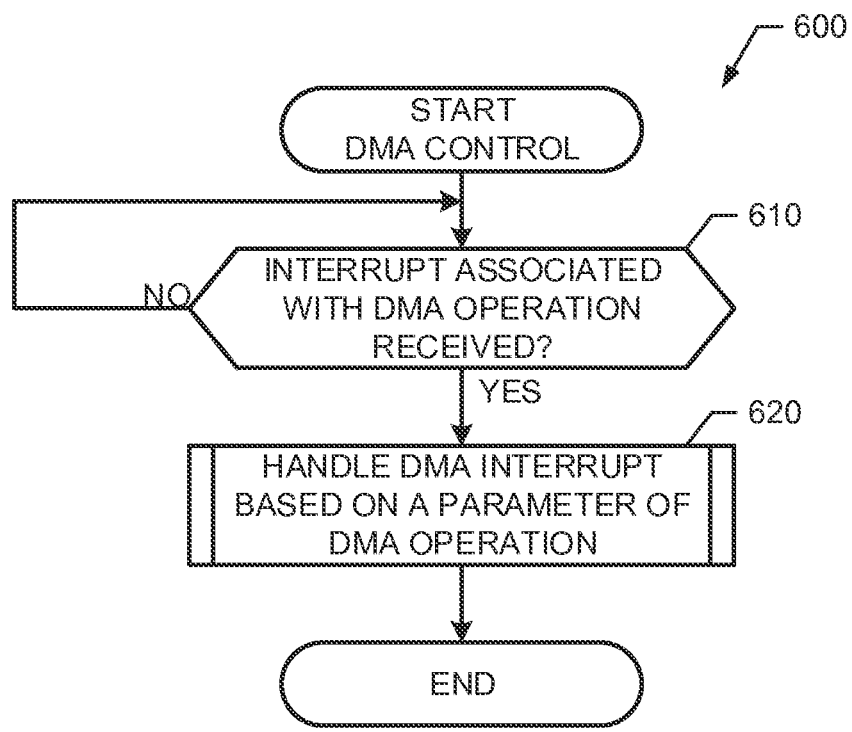
FIG. 6 is a flowchart representative of example machine readable instructions that may be executed to implement the cache coherency manager of FIG. 1.
Figure 7:
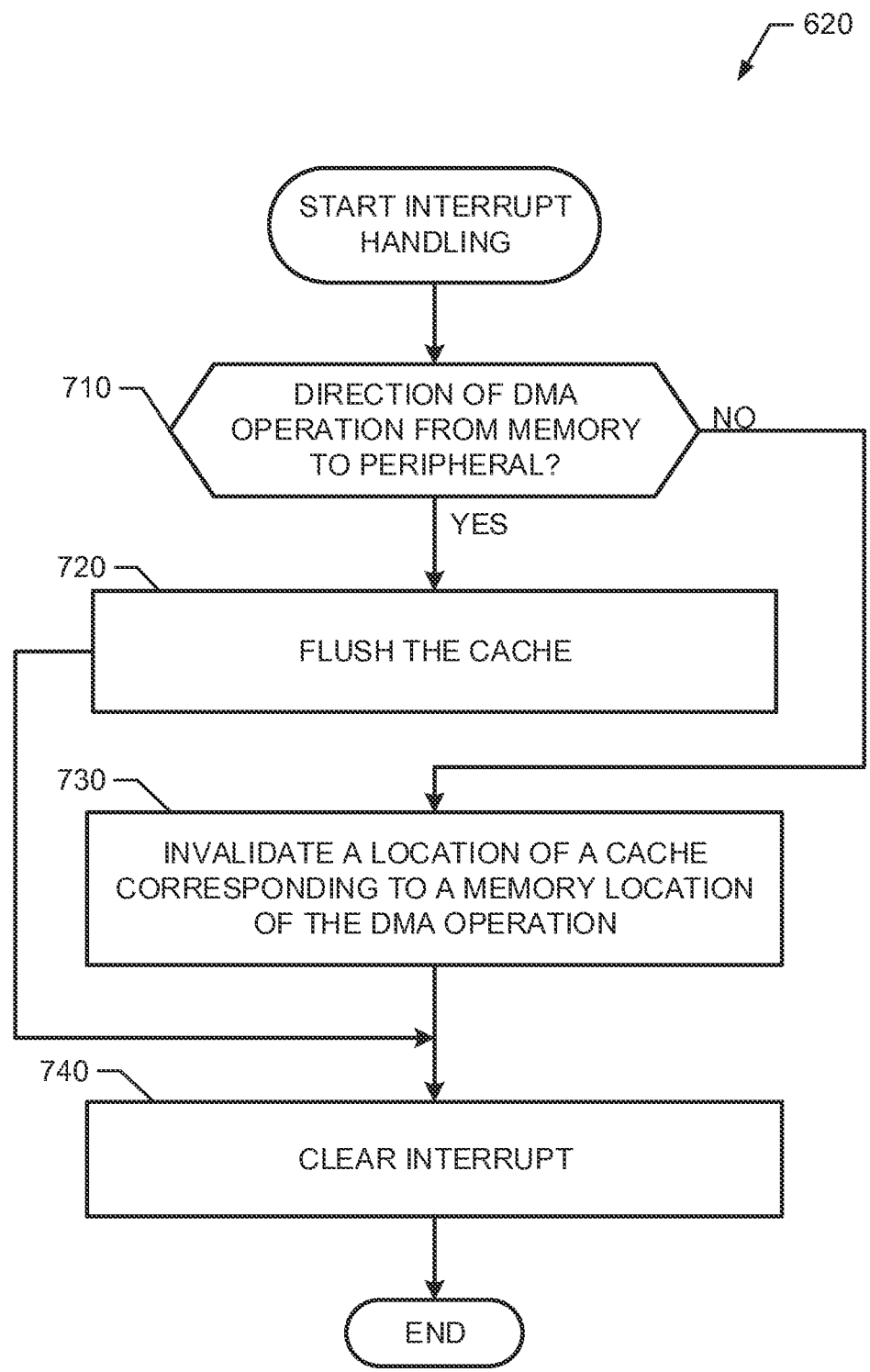
FIG. 7 is a flowchart representative of example machine readable instructions that may be executed to implement a portion of the example machine readable instructions of FIG. 6 to implement the cache coherency manager of FIG. 1.

Flowcharts representative of example machine readable instructions for implementing the cache coherency manager 110 of FIGS. 1, 2A, 2B, 3, 4, and/or 5 are shown in FIGS. 6 and 7. In this example, the machine readable instructions comprise a program/process for execution by the processor 120 of FIG. 1. The program/process may be embodied in computer readable instructions stored on a tangible computer readable storage medium such as a CD-ROM, a floppy disk, a hard drive, a digital versatile disk (DVD), a Blu-ray disk, or a memory associated with the processor 120, but the entire program/process and/or parts thereof could alternatively be executed by a device other than the processor 120 and/or embodied in firmware of the processor 120 or dedicated hardware associated the processor 120. Further, although the example program is described with reference to the flowcharts illustrated in FIGS. 6 and 7, many other methods of implementing the example cache coherency manager 110 may alternatively be used. For example, the order of execution of the blocks may be changed, and/or some of the blocks described may be changed, eliminated, or combined.

The example process 600 of FIG. 6 begins with an initiation of the cache coherency manager 110 (e.g., upon startup of the processor system 100, upon installation of the cache coherency manager 110 within processor 120, upon execution by the processor 120, etc.). At block 610, the interrupt manager 310 determines whether an interrupt associated with a DMA operation is received. If an interrupt has not been received, the interrupt manager 310 continues to monitor for receipt of an interrupt (control returns loops at block 610). If the interrupt manager 310 determines that an interrupt has been received, the cache coherency manager 110, at block 620, handles the DMA interrupt based on a parameter of the DMA operation. After block 620 of FIG. 6, the process ends.

The example process 620 of FIG. 7, which may be used to implement block 620 of FIG. 6, begins with an initiation of the cache coherency manager 110. At block 710 of FIG. 7, the interrupt manager 310 determines if a direction of the DMA operation is from a memory to a peripheral. For example, at block 710, the interrupt manager 310 may identify a direction parameter from the received interrupt to determine the direction of the DMA operation. For example, a direction of the DMA operation may be based on whether the operation is a read or write operation. If the interrupt manager 310 determines that the direction of the DMA operation is from a memory of the processor system 100 (e.g., the volatile memory 150 or the non-volatile memory 160) to a peripheral of the processor system 100 (e.g., an application or driver executed by the processor 120, the interface circuit 180, the input device(s) 182, the output device(s) 184, the network 186, the mass storage device 190, etc.), at block 720, the cache flusher 320 flushes the cache 130.

If, at block 710, the interrupt manager 310 determines that the direction of the DMA operation is not from a memory of the processor system 100 to a peripheral of the processor system 100 (e.g., it is from a peripheral to a memory), control advances to block 730. At block 730 of the example of FIG. 7, the cache invalidator 330 invalidates a location of the cache 130 corresponding to a memory location of the DMA operation in the volatile memory 150 and/or the non-volatile memory 150. For example, at block 730, the cache invalidator 330 may determine a memory location from an address parameter of the DMA operation. After block 720 or 730, the interrupt manager 310 clears the interrupt by sending a message to the DMA controller 140 indicating that the interrupt was handled. After block 740, the process 620 of FIG. 7 ends.

Figure 8:
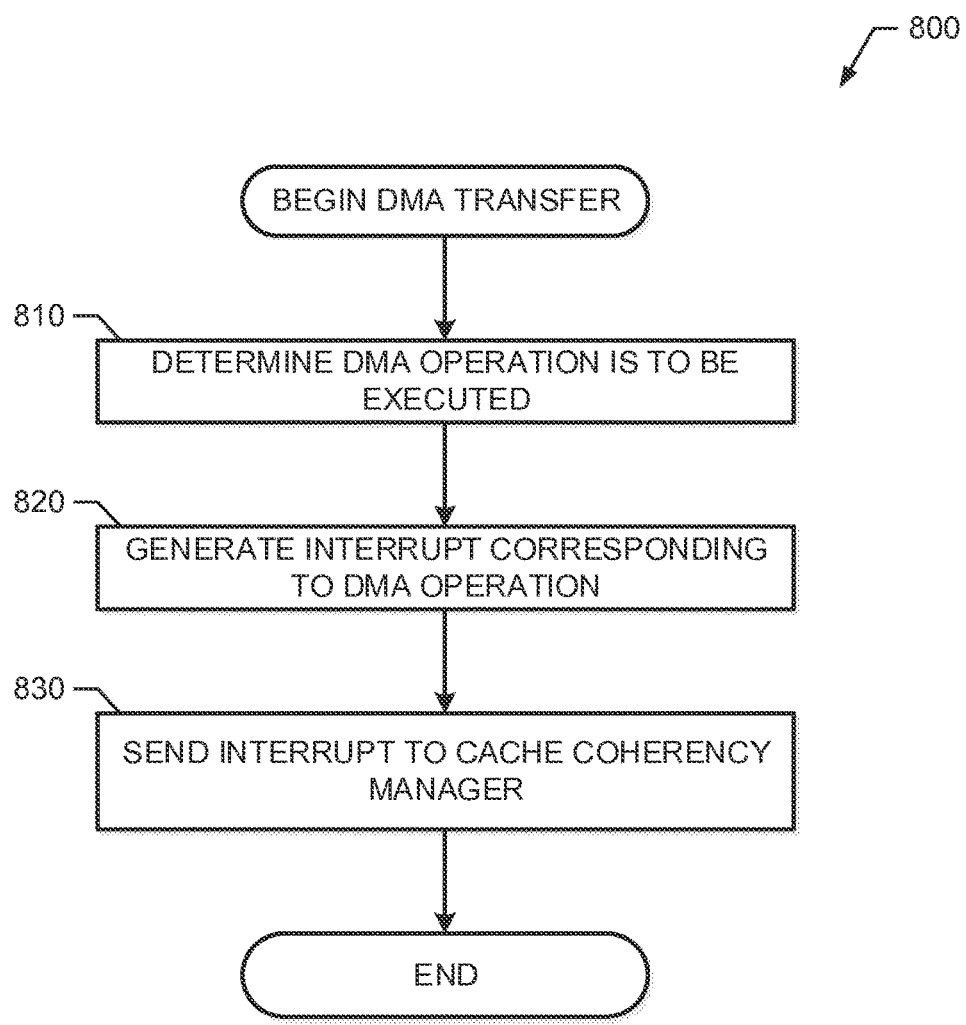
FIG. 8 is a flowchart representative of an example process and/or machine readable instructions executed by a direct memory access controller associated with the cache coherency manager of FIG. 1.

A flowchart representative of a process and/or example machine readable instructions for implementing the DMA controller 140 of FIG. 1 is shown in FIG. 8. In this example, the process and/or machine readable instructions are executed by the DMA controller 140. The program/process may be embodied in software stored on a tangible computer readable storage medium such as a CD-ROM, a floppy disk, a hard drive, a digital versatile disk (DVD), a Blu-ray disk, or a memory associated with the DMA controller 140, but the entire program/process and/or parts thereof could alternatively be executed by a device other than the DMA controller 140 and/or embodied in firmware or dedicated hardware. Further, although the example program/process is described with reference to the flowchart illustrated in FIG. 8, many other methods of implementing the example DMA controller 140 may alternatively be used. For example, the order of execution of the blocks may be changed, and/or some of the blocks described may be changed, eliminated, or combined.

The process 800 of FIG. 8 begins with an initiation of the DMA controller 140 (e.g., upon startup of the processor system 100, upon startup of the DMA controller 140, upon installation of the DMA controller 140, etc.). At block 810, the DMA controller 140 determines that a DMA operation is to be executed. For example, at block 810, the DMA controller 140 may monitor for and/or detect an attempted DMA to the volatile memory 150 and/or the non-volatile memory 150 over the platform bus 170 of FIG. 7. As another example, the DMA controller 140 may receive requests to execute DMA operations from peripherals (e.g., applications/drivers executing on the processor 120, the interface circuit 180, the mass storage device 190, etc.).

At block 820, the DMA controller generates an interrupt corresponding to the DMA operation. For example, the generated interrupt may indicate parameters of the DMA operation. Example parameters may include a direction of the DMA operation, a source address, a destination address, a size of the DMA operation, a data format (byte, word, etc.) of the DMA operation, etc.). At block 830, the DMA controller 140 sends the interrupt to the cache coherency manager 110. Accordingly, the cache coherency manager 110, in accordance with the teachings of this disclosure, may maintain cache coherency within the processor system for the DMA operation of block 810. After block 830, the process 800 ends.

As mentioned above, the example processes of FIGS. 6, 7, and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

From the foregoing, it will be appreciated that the above disclosed methods, apparatus and articles of manufacture involve maintaining cache coherency of a processor system using a cache coherency manager. In examples disclosed herein, a DMA controller generates and sends an interrupt to the cache coherency manager to maintain cache coherency by flushing and/or invalidating a cache of the processor system. In some examples, the cache coherency manager may be implemented via software executed by a processor and/or by firmware of a processor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions that, when executed, cause a processor to at least:
   receive, from a direct memory access controller, an interrupt associated with a direct memory access operation; and
   handle the interrupt via the processor to maintain cache coherency based on a direction of the direct memory access operation, the interrupt generated by the direct memory access controller and comprising the direction, wherein the direction of the direct memory access operation includes:
      a direct memory access operation from a memory to a peripheral; or
      a direct memory access operation from the peripheral to the memory;
   wherein the direct memory access controller is to execute the direct memory access operation.

2. The non-transitory computer readable storage medium of claim 1, wherein the instructions, when executed cause the processor to:
   handle the interrupt by flushing a cache associated with the direct memory access operation in response to the direction of the direct memory access operation being from the memory to the peripheral.

3. The non-transitory computer readable storage medium of claim 1, wherein the instructions, when executed cause the processor to:
   handle the interrupt by invalidating a location of a cache corresponding to a memory location of the direct memory access operation in response to the direction of the direct memory access operation being from the peripheral to the memory.

4. The non-transitory computer readable storage medium of claim 1, wherein firmware of the processor comprises the instructions.

5. The non-transitory computer readable storage medium of claim 1, the instructions comprise a first software layer of a processor and the direct memory access operation was initiated by a module running on a second software layer of the processor.

6. A system comprising:
   a direct memory access controller to:
      determine that a direct memory access operation is to be executed;
      generate an interrupt indicating that the direct memory access operation is to be executed, wherein the interrupt includes a direction of the direct memory access operation, the direction of the direct memory access operation including:
         a direct memory access operation from a memory of the system to a peripheral communicatively coupled with the system; or
         a direct memory access operation from the peripheral communicatively coupled with the system to the memory of the system;
      send the interrupt to a cache coherency manager of a processor; and
   the processor comprising the cache coherency manager to handle the interrupt based on the direction of the direct memory access operation.

7. The system of claim 6, wherein the cache coherency manager is to handle the interrupt by flushing a cache of the system in response to the direction of the direct memory access operation being from the memory of the system to the peripheral communicatively coupled with the system.

8. The system of claim 6, wherein the cache coherency manager is to handle the interrupt by invalidating a location of a cache corresponding to a memory location of the direct memory access operation in response to the direction of the direct memory access operation being from the peripheral of the system to the memory of the system.

9. The system of claim 6, wherein the cache coherency manager is a portion of system firmware, the system firmware comprising computer readable instructions to run a processor platform of the system.

10. A method comprising:
    determining, via a hardware direct memory access controller, that a direct memory access operation is to be executed;
    generating, via the hardware direct memory access controller, an interrupt corresponding to the direct memory access operation, wherein the interrupt includes a direction of the direct memory access operation, the direction of the direct memory access operation including:
       a direct memory access operation from a memory associated with the direct memory access operation to a peripheral; or a direct memory access operation from the peripheral to the memory associated with the direct memory access operation;

sending, via the hardware direct memory access controller, the interrupt to a cache coherency manager of a processor, the cache coherency manager to handle the interrupt based on the direction of the direct memory access operation to maintain cache coherency.

11. The method of claim 10, wherein determining that the direct memory access operation is to be executed comprises receiving a data request from a first software layer of a processor.

12. The method of claim 11, wherein a second software layer of the processor comprises the cache coherency manager, the first software layer being different from the second software layer.

13. The method of claim 10, wherein the interrupt indicates that the cache coherency manager is to flush a cache associated with the memory associated with the direct memory access operation in response to the direction of the direct memory access operation being from the memory to the peripheral.

14. The method of claim 10, wherein the interrupt indicates that the cache coherency manager is to invalidate a cache location corresponding a location of the memory associated with the direct memory access operation when the direction of the direct memory access operation is from the peripheral to the memory associated with the direct memory access operation.

* * * * *